No. 677,814. Patented July 2, 1901.
C. W. STAPLETON.
RUBBER TIRE.
(Application filed Nov. 23, 1900.)
(No Model.)
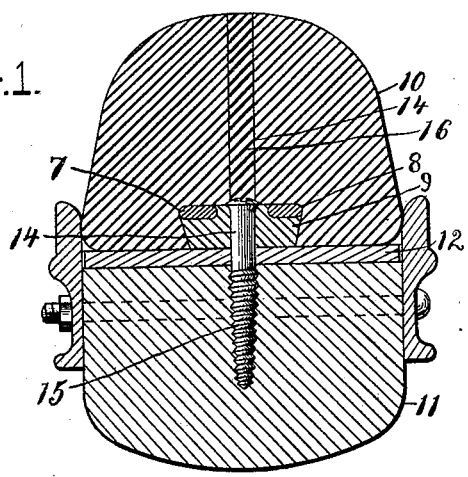
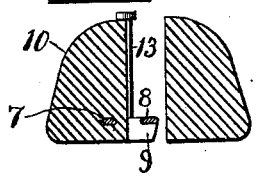
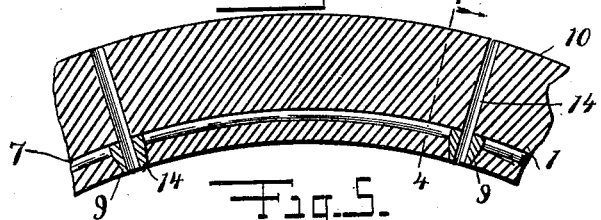
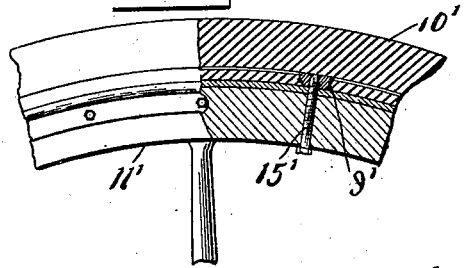
WITNESSES:
INVENTOR
BY
ATTORNEY

UNITED STATES PATENT OFFICE.

CHARLES W. STAPLETON, OF NEW YORK, N. Y.

RUBBER TIRE.

SPECIFICATION forming part of Letters Patent No. 677,814, dated July 2, 1901.

Application filed November 23, 1900. Serial No. 37,511. (No model.)

*To all whom it may concern:*

Be it known that I, CHARLES W. STAPLETON, a citizen of the United States, residing at New York, in the county and State of New York, have invented a new and useful Rubber Tire, of which the following is a specification.

My invention relates to improvements in rubber tires and in the method of securing them to vehicle-wheels, and has for its object to provide retaining devices which can be used with endless rubber tires.

I attain the object of my invention by the construction illustrated in the accompanying drawings, in which—

Figure 1 is a vertical section through a rubber tire at one of the points where it is anchored to the wheel. Fig. 2 is a section of the retaining device. Fig. 3 is a longitudinal vertical section of a portion of a tire, the rubber in front being removed to expose the band. Fig. 4 is a transverse section of one-half of the tire in the process of manufacture, and Fig. 5 is a view of a modified form of construction.

In the accompanying drawings the different features of my invention are indicated by numerals of reference, and in the practice of my invention I provide a retaining device which consists of two flat bands 7 and 8, each of which is of considerable thickness and provided with rounded edges, as clearly shown in Figs. 1 and 4. At stated intervals along the bands I mount a cross-bar 9, which is rabbeted at the upper corners to receive the bands 7 and 8, which may be secured to the cross-bars by riveting or by brazing or in any desired manner. The cross-bars 9 are proportioned in depth, so that when the bands are mounted in a tire at the desired distance from the base thereof the bottom of the cross-bar will be in the same plane as the base of the tire 10, and when mounted on a vehicle-wheel 11 the cross-bars will be in contact with the steel tire 12.

As previously stated, the retaining device is designed especially for use with endless rubber tires, and in manufacturing the tires the retaining device is mounted therein during the process of manufacture, as shown in Fig. 4. The tire 10 is molded in two pieces, the division being at the vertical center, and while in a plastic condition the device is pressed half way into one half of the tire, while a bolt 13, mounted in an aperture 14 in the cross-bar 9, extends above the top or periphery of the tire. The other half of the tire is then pressed onto the device until it meets the opposite side, when the tire is vulcanized, with the device and bolt 13 in position, after which the bolt is withdrawn, leaving a passage 14 through the tire 10 to the top of the cross-bar, through which a screw 15 may be inserted into the wheel, after which the passage 14 may be filled by a rubber plug 16, as will be readily understood.

Instead of passing the screw through the tire I may pass a screw or bolt 15' through the felly of the wheel into the cross-bar 9', as shown in Fig. 5, and it is also evident that I could combine the two methods in the same tire, if desired, passing part of the screws through the tire and part through the felly of the wheel.

It will thus be seen that I have not only provided a retaining device for securing an endless rubber tire to a vehicle-wheel, but also a device which will prevent the creeping of the tire on the wheel, and as there is no rubber intervening between the cross-bars 9 and the steel tire there will be no rubber to be cut through by the retaining device on account of great pressure, and the only strain on the rubber will be that which is produced by the movement of the vehicle.

While I have shown or described my invention as being especially adapted for use with endless rubber tires, it is very evident that the retaining device could be used with equal advantage with tires molded in a straight piece and afterward formed into a hoop. It is also evident that many changes can be made in the detail of construction—as the mounting of the bands upon the top of the cross-bars without rabbeting the cross-bars, or in small tires the use of a single band with blocks mounted on the under side thereof and proportioned to extend down to the base plane, and many other changes—without departing from the spirit of my invention, and I reserve the right to make such changes.

Having thus described my invention, what I claim as new, and desire to secure by Letters Patent, is—

1. The combination with a rubber tire of a retaining device comprising parallel bands, a plurality of cross-bars connected therewith and extending to the base plane of the tire, as and for the purpose set forth.

2. The combination with a rubber tire of a retaining device, comprising two parallel bands having rounded edges, a plurality of cross-bars secured to said bands and extending to the base plane of the tire, said cross-bars being rabbeted at the upper edges, and the bands being mounted in said rabbeted edges, as and for the purpose set forth.

3. A rubber tire, a retaining device mounted therein, comprising two parallel bands, a plurality of cross-bars connecting the same and extending to the base plane of the tire, said tire being provided with a vertical passage therethrough to the center of each of said cross-bars, as and for the purpose set forth.

4. A rubber tire, a retaining device mounted therein, the same comprising two parallel bands, a plurality of cross-bars connecting the bands and having a central passage therethrough, said tire being provided with a vertical passage coinciding with the passage in each of said cross-bars, as and for the purpose set forth.

5. The combination with a vehicle-wheel of a rubber tire, a retaining device mounted therein and comprising two parallel bands a plurality of cross-bars connecting the same and extending to the base plane of said tire, said cross-bars being provided with apertures therethrough, vertical passages in said tire which coincide with the apertures in the cross-bars, a retaining-screw passing through the cross-bars into the felly of the wheel, and a rubber plug mounted in each of the passages through the rubber tire, as and for the purpose set forth.

In testimony whereof I have signed my name to this specification in the presence of two subscribing witnesses.

CHARLES W. STAPLETON.

Witnesses:
VALERIE M. HUFTLEIN,
CURTIS WIGG.